Jan. 6, 1953 J. T. POTTER 2,624,786

MATRIX STORAGE SYSTEM

Filed Nov. 8, 1949 4 Sheets-Sheet 1

INVENTOR.
JOHN T. POTTER
BY Alfred W. Barber
ATTORNEY

*INVENTOR.*
JOHN T. POTTER
*BY* Alfred W. Barber
*ATTORNEY*

Jan. 6, 1953 | J. T. POTTER | 2,624,786

MATRIX STORAGE SYSTEM

Filed Nov. 8, 1949 | 4 Sheets-Sheet 3

INVENTOR.
JOHN T. POTTER
BY Alfred W. Barber
ATTORNEY

Jan. 6, 1953 J. T. POTTER 2,624,786

MATRIX STORAGE SYSTEM

Filed Nov. 8, 1949 4 Sheets-Sheet 4

INVENTOR.
JOHN T. POTTER
BY Alfred W. Barber
ATTORNEY

Patented Jan. 6, 1953 2,624,786

UNITED STATES PATENT OFFICE 2,624,786

MATRIX STORAGE SYSTEM

John T. Potter, Port Washington, N. Y.

Application November 8, 1949, Serial No. 126,090

5 Claims. (Cl. 175—321)

The present invention concerns punched card systems and, in particular, methods of and means for electronically scanning punched cards and deriving information or data therefrom.

The punched card is used in many forms to record information in a manner which permits classification or the removal of certain data by mechanical means. The information carried by the card depends upon the configuration of punched holes. According to one system of punching, holes are punched in one or more of four possible hole locations in a grouping with many group positions. In the group of four hole locations one hole represents the number one, another the number 2, another 4 and another 6 so that any number from 1 to 10 may be represented by the sum of a combination of one or more holes. A key or commutator hole may be associated with each group of four hole positions.

The present invention concerns a system for electronically scanning punched cards and deriving information or data therefrom. In particular, a system is described for scanning cards punched according to the four hole code mentioned above. Four photo-electric cells are utilized to simultaneously scan a group of four holes. If one or more holes are present in the group a pulse is generated which, after suitable amplification, is utilized to set up corresponding relays or perform other similar functions. The commutator or key slot associated with each group of four holes is also scanned by means of a fifth photo-electric cell and the resulting pulse after amplification is utilized to indicate when the four hole-scanning photo-electric cells are in register with a group of holes and to advance the relay group response in accordance with the hole group advance. The keying of the output from the hole scanning photo-electric cells is accomplished by mixing their output pulses with pulses from the commutator photo-electric cell to provide an output pulse when the two input pulses coincide. The output pulse triggers a thyratron which in turn pulls up a relay making a circuit contact for further utilization. A thyratron and relay is provided for each hole position. If the punched card has 10 groups of 4 hole positions, 40 thyratrons and 40 relays are provided. Since the scanning photo-electric cells are provided only in a number to correspond with the number of holes in a group, in the illustration 4, means is provided for distributing the pulses in accordance with the particular group being scanned at a given instant. The thyratrons and relays are connected in groups of 4, also, and the pulses from the scanning photo-electric cells are properly distributed by means of a ring counter advanced by pulses from the commutator photo-electric cell.

Accordingly one object of the present invention is to provide a method of and means for electronically deriving information or data from punched cards.

Another object is to provide a scanning system for punched cards in which the punched holes are scanned in groups.

Still another object is to provide for properly channeling pulses generated by scanning groups of holes to operate the corresponding indicating or circuit closing means such as relays.

A further object is to scan punched cards by groups of holes in which each group represents a digit or single code symbol.

A still further object is to provide a simple system for electronically scanning and registering punched cards.

These and other subjects of the present invention will be apparent from the detailed description of the invention given in connection with the various figures of the drawing.

Figure 1:
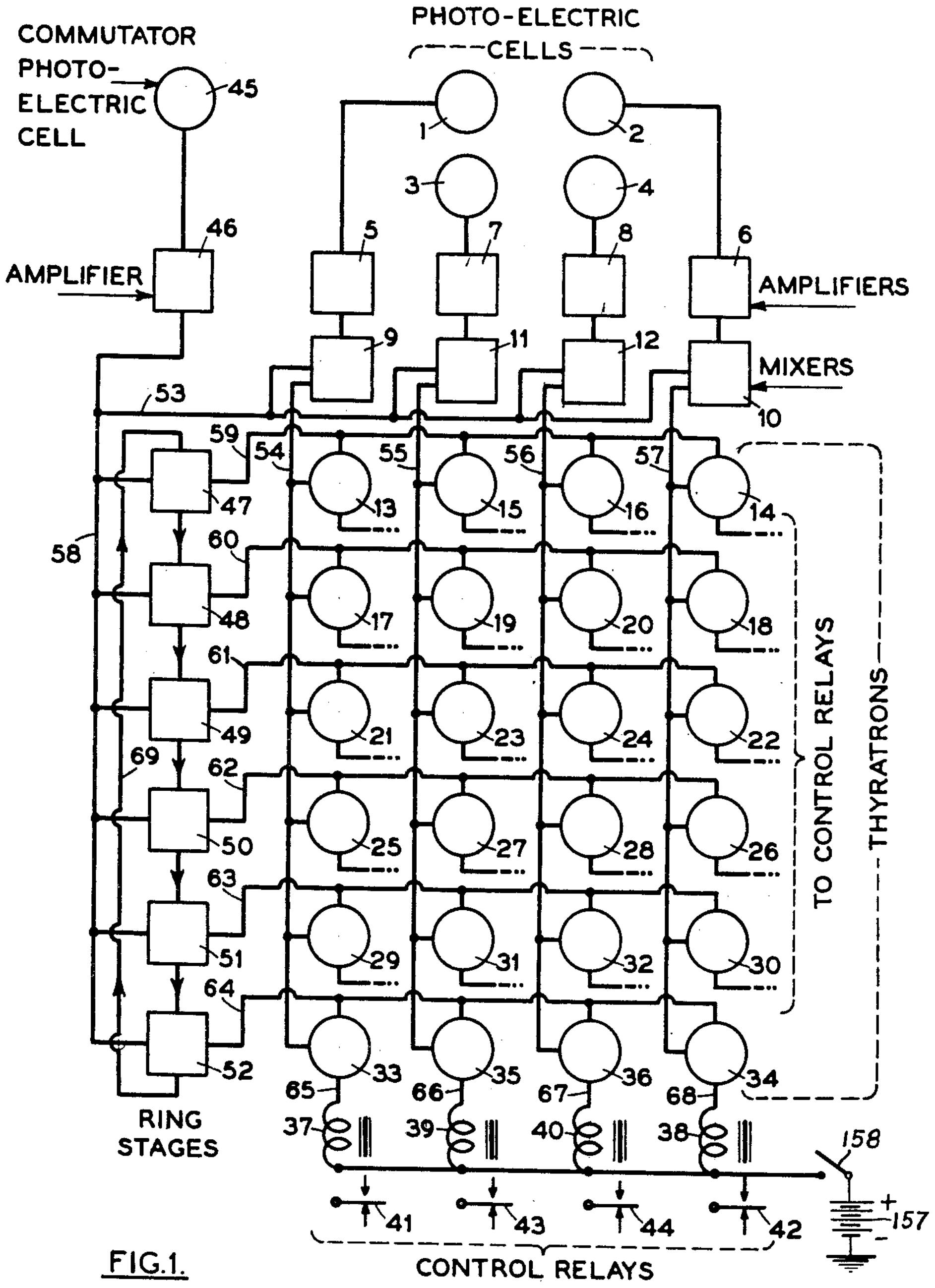
Fig. 1 shows a block diagram representation of one form of the present invention.

Fig. 1 shows a block diagram in which the scanning is accomplished by four photo-electric cells 1, 2, 3 and 4 feeding pulses to amplifiers 5, 6, 7 and 8 from which the amplified pulses are applied to mixers 9, 10, 11 and 12. The mixers also receive pulses from commutator slot scanning photo-electric cell 45 amplified by amplifier 46 and applied over lead 53. These mixers, as will be more completely explained in connection with Fig. 2, produce output pulses when the two input pulses, one from a scanning photo-electric cell and one from the commutator photo-electric cell, coincide. The commutator pulse indicates that the four scanning photo-electric cells are centered over a group of four hole positions on the punched card. The diagram shows a system for scanning a card having six groups of four hole positions or twenty-four hole positions. The mixer outputs are connected each to a row of six relay control thyratrons controlling six relays. Thus there is a control thyratron and a relay for each hole position. The output of mixer 9 is connected over lead 54 to the six thyratrons 13, 17, 21, 25, 29 and 33. Each of these thyratrons controls a relay one of which is shown as 37 connected over lead 65 to thyratron 33. The output of commutator photo-electric cell amplifier 46 is also fed over lead 58 to a ring counter of six stages 47, 48, 49, 50, 51 and 52 which in turn are cross-connected to the thyratrons by means of leads 59, 60, 61, 62, 63 and 64. A ring stage which is "on" acts to prime its four connected thyratrons as, for instance, when ring counter stage 47 is "on" thyratrons 13, 15, 16 and 14 are primed and a pulse received from any one of the scanning photo-electric cells through the mixers will cause the corresponding thyratron to fire and pull up its relay. There is a commutator slot associated with each group of four holes to be scanned and its scanning pulse from amplifier 46 serves to advance the "on" position in the ring by one stage. Starting with ring stage 47 "on," the next commutator pulse shifts the "on" condition to ring stage 48 thereby priming thyratrons 17, 19, 20 and 18 and pulses from any one of the scanning photo-electric cells will fire the corresponding one of these. Similarly, ring stage 49 primes thyratrons 21, 23, 24 and 25, ring stage 50 primes 25, 27, 28, and 26; ring stage 51 primes 29, 31, 32 and 30; and ring stage 52 primes 33, 35, 36 and 34. Mixer 9 connects to its row of thyratrons over lead 54, mixer 11 over lead 55, mixer 12 over lead 56 and mixer 10 over lead 57. A thyratron fires whenever it receives a pulse from a mixer and is primed by its connected ring stage. The ring stages are reset in any suitable manner as by returning stage 52 to stage 47 over lead 69. Each of the thyratrons is connected to a relay. For simplicity relays are only shown connected to thyratrons 33, 35, 36 and 34. The relays are shown as 37, 39, 40 and 38 with contactors 41, 43, 44 and 42. Whenever a thyratron fires, its relay is energized closing the upper contact of its contactor. The circuits thus made may be utilized in any suitable manner. Resetting the thyratrons may be accomplished by opening switch 158 thereby removing energizing voltage from battery 157 from the relays and their thyratrons.

Figure 2:
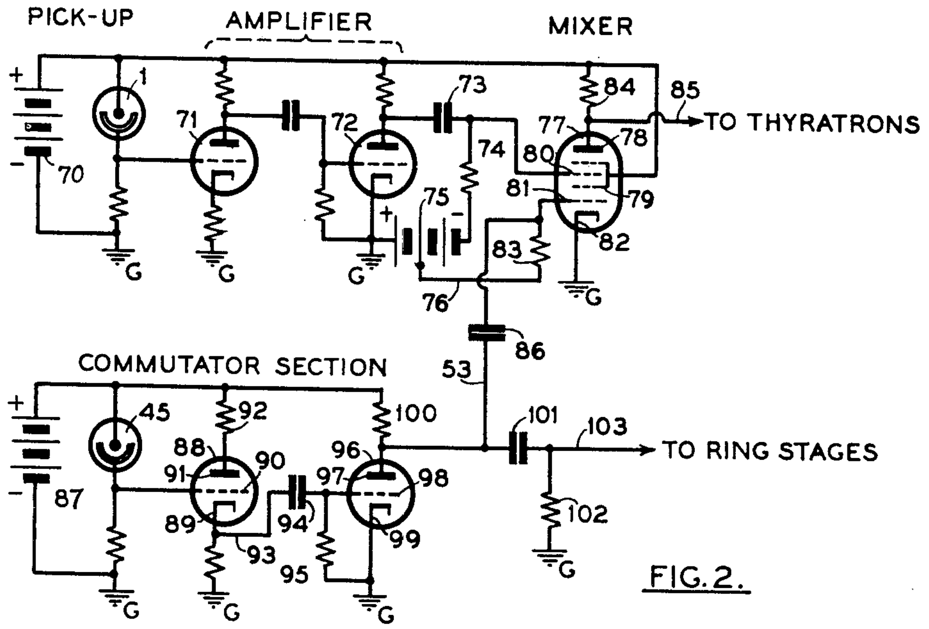
Fig. 2 shows circuit details of a portion of the form of the invention shown in Fig. 1.

Fig. 2 shows circuit details of one possible form of pick-up photo-electric cell, amplifier, mixer, commutator photo-electric cell and its amplifier suitable for use in the front end of the system shown in Fig. 1. The pick-up photo-electric cell 1 energized by battery 70 feeds the amplifier made up of tubes 71 and 72 with pulses derived from scanning holes in the punched cards. The output of amplifier tube 72 is applied to grid 80 of mixer tube 77 through coupling capacitor 73. Mixer tube 77 may be any suitable mixer tube such as the one shown having cathode 82, first grid 81, screen grid 79, third grid 80 and plate 78. Screen 79 and plate 78 are energized from battery 70 and plate 78 is loaded by resistor 84. Grids 81 and 80 receive bias voltages from a suitable source such as battery 75 through grid resistors 83 and 74 respectively.

Commutator slots in the punched cards are scanned by photo-electric cell 45 energized by battery 87. Pulses resulting from the scanning are applied to grid 90 of amplifier tube 88 which may be any suitable tube such as the triode shown having cathode 89, control grid 90 and plate 91. Further amplification may be provided by a second suitable amplifier stage consisting of triode 96 having cathode 99, control grid 98 and plate 97. The output of tube 88 is taken from cathode 89 by lead 93 to coupling capacitor 94 and grid 98 in order to provide the desired polarity of the final amplified output pulse. Plate 97 is loaded by means of resistor 100 and amplified pulses across it are fed to mixer grid 81 through coupling capacitor 86 and to the ring stages over lead 103. The pulses to the ring stages may be shaped to make them sharp by means of the time constant circuit made up of capacitor 101 and resistor 102 in series and in shunt respectively with the pulse circuit. The coincidence of a pulse from the scanning photo-electric cell 1 on grid 80 and from commutator photo-electric cell 45 on grid 81 produces an output pulse in the mixer across load resistor 84 which is applied to the corresponding column of thyratrons over lead 85.

Figure 4:
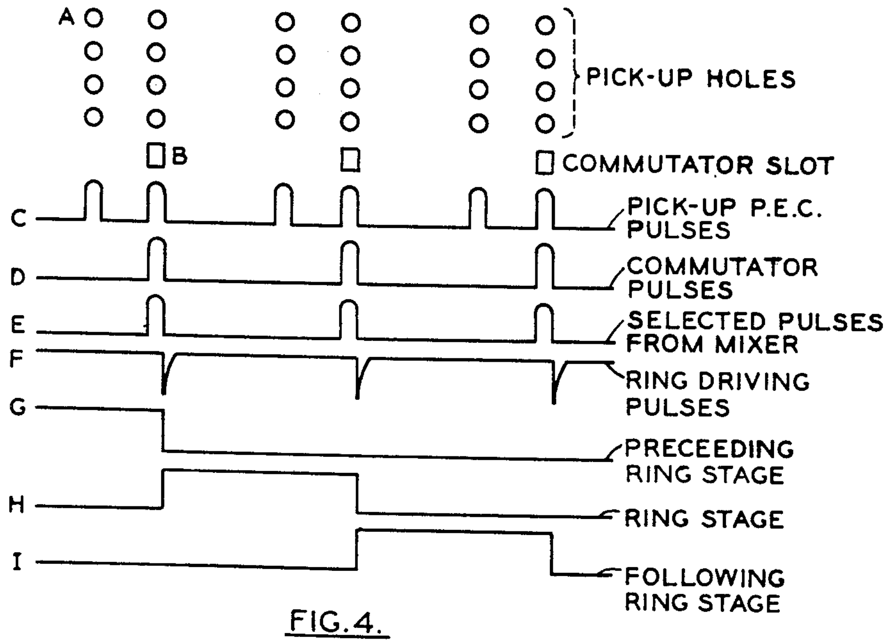
Fig. 4 shows various representations of the card holes and generated pulses useful in explaining the mode of operation of the invention.

Fig. 4 shows a typical group of pick-up holes A to be scanned by the pick-up photo-electric cells in groups of 4. Also is shown the commutator slots B associated with each double column of pick-up holes. At C is shown the pulses that are generated by a single scanning photo-electric cell. Whereas only one pulse is required from each scanning photo-electric cell for each group of four card holes it will be seen that two are generated as shown at C since each pick-up photo-electric cell scans the hole beside it as well as the desired hole. The pulses generated by the commutator photo-electric cell are shown at D and the resulting mixer output pulses at E showing the elimination of the extraneous pick-up pulses. At F are shown the shaped commutator output pulses for driving the ring stages. At H is shown, by the pedestal, the "on" period of a given ring stage. The sequence is carried out by G and I which show the "on" periods of the preceding and following ring stages. It will be noted that the scanning pulses and the commutator pulse occur during the "on" period of the corresponding ring stage and that at the end of the sequence the shaped commutator pulse serves to shift the "on" condition to the next ring stage.

Figure 3:
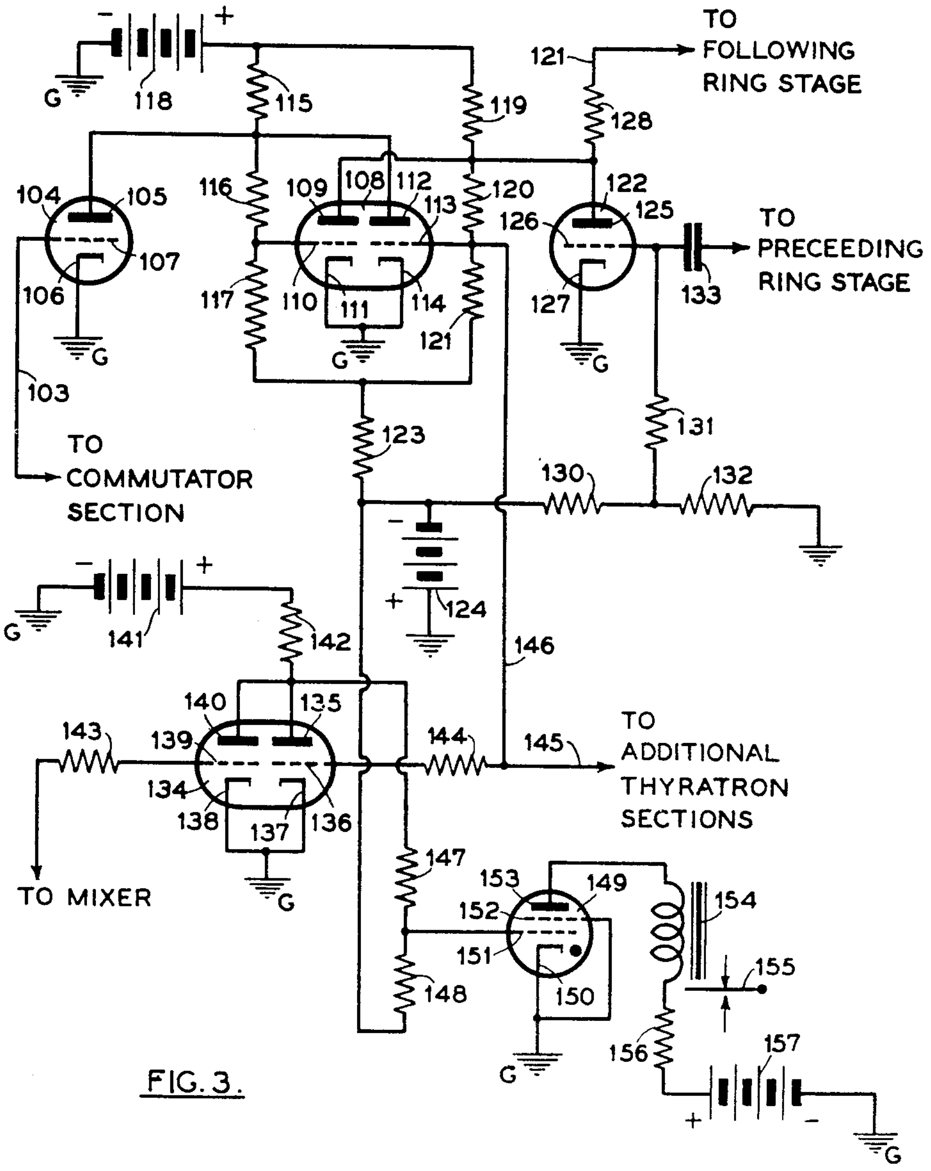
Fig. 3 shows circuit details of another portion of the form of the invention shown in Fig. 1.

Fig. 3 shows circuit details of ring stage, thyratron, and relay circuit suitable for use in the system shown in Fig. 1. The ring stage includes a flip-flop dual tube 108, an input-output coupling tube 122 and a commutator pulse coupling tube 104. The flip-flop tube 108 includes cathodes 111 and 114 and corresponding grids 110, 113 and plates 109 and 112. Cathodes 111 and 114 are connected to ground G. A suitable source of plate voltage such as battery 118 is provided with its negative side grounded. The positive side feeds two series-parallel resistor chains, one consisting of resistors 115, 116 and 117 and the other 119, 120 and 121 connected between battery 118 and one end of common resistor 123. The other end of common resistor 123 is connected to a suitable source of negative bias voltage such as battery 124. Plate 112 is connected to the junction between resistors 115 and 116; grid 110 to the junction between resistors 116 and 117; plate 109 to the junction between resistors 119 and 120; and grid 113 to the junction between resistors 120 and 121. In its static condition this circuit is stable with either plate conducting and the conduction may be shifted from one plate to the other by means of an applied pulse. Reference is made to application Ser. No. 657,581 entitled "Predetermined Electronic Counter," filed on March 27, 1946, now Patent No. 2,574,283.

To describe the operation of this circuit as a ring stage assume that the stage is initially "off." This is the condition in which plate 112 conducts and plate 109 does not conduct. With plate 109 non-conducting, its voltage is highly positive, since there is a minimum drop from the positive side of battery 118 through resistor 119 and as a result the junction between resistors 120 and 121 is also positive and lead 146 is maintained at a positive voltage, the significance of which will be set forth below. The coupling tube 122 having cathode 127, control grid 126 and plate 125 is connected with cathode 127 connected to ground G, grid 126 to bias battery 124 through resistor 131 to the junction of divider resistors 130 and 132 and plate 125 to plate 109. Grid 126 is also coupled to the preceeding ring stage through coupling capacitor 133. When the preceding ring stage is turned off, a positive pulse is applied to grid 126 which pulls down the voltage of plate 125 and hence, also, pulls down the voltage on plate 109 causing the conductivity of plates 109 and 112 to shift from plate 112 to plate 109. With plate 109 conducting there is an increased voltage drop in resistor 119 and a negative voltage is applied to lead 146. Thus, during the period while the ring stage is "on" a negative voltage is applied to lead 146.

The end of the "on" period is determined by the shaped commutator pulse. This pulse is received over lead 103 and is applied to grid 107 of the commutator pulse coupling tube 104. Cathode 106 of tube 104 is connected to ground G and plate 105 is connected to plate 112. When a positive pulse is received on grid 107 from the commutator section, a negative pulse is induced at plate 105 dropping the voltage of plate 112 and causing the conductive condition to shift back from plate 109 to plate 112. Thus, the cycle is completed and the ring stage is in its initial condition. When the conductivity condition shifts as the ring stage goes off, the voltage of plate 109 rises suddenly applying a positive pulse through resistor 128 to lead 121. This positive pulse is applied to the following ring stage to turn it on starting a cycle of operation in it.

The negative voltage applied to lead 146 by the "on" condition of the ring stage is utilized to prime the thyratron. The thyratron stage may be taken to include the actual thyratron 149 and a coupling dual tube 134. Thyratron 149 may be any suitable thyratron such as the one shown including cathode 150, connected to ground G, control grid 151, second grid 152 connected to the cathode and plate 153 connected to the coil of relay 154 and through a current limiting resistor 156 to a suitable source of voltage such as battery 157. Coupling dual tube 134 includes cathodes 137, 138 with corresponding grids 136, 139 and plates 135 and 140 respectively. Plates 135 and 140 are connected together and through a common load resistor 142 to a suitable plate voltage source such as battery 141. Plates 135 and 140 are also connected through resistor 147 to grid 151 of thyratron 149. A suitable initial negative bias is applied to grid 151 from source 124 through resistor 148. Negative pulses from the mixer are applied to grid 139 through resistor 143. The negative "on" condition voltage from the ring stage is applied to grid 136 through resistor 144. When the ring stage is "off," a positive voltage is applied to grid 136 over lead 145 and plate 135 conducts. With plate 135 conducting, its voltage is dropped to a low value by the plate current drop in resistor 142. Since plate 140 is connected to plate 135, its voltage will also be low and pulses applied to grid 139 from the mixer will not be amplified. When the ring stage is "on" a negative voltage is applied to grid 136 rendering plate 135 non-conducting. While plate 135 is non-conducting, its voltage is high due to the fact that no drop takes place in resistor 142. Again, since plate 135 is tied to plate 140, plate 140 will be high when plate 135 is high and pulses applied to grid 139 from the mixer will be amplified. Negative pulses applied from the mixer to grid 139 are amplified and reversed in phase at plate 140 and applied to grid 151 causing thyratron 149 to fire. Thus, thyratron 149 is fired by pulses received from the mixer during the "on" period of the ring stage. The firing of thyratron 149 causes current to flow to plate 153 through the relay coil and changing the contact condition of relay contactor 155.

Figure 5:
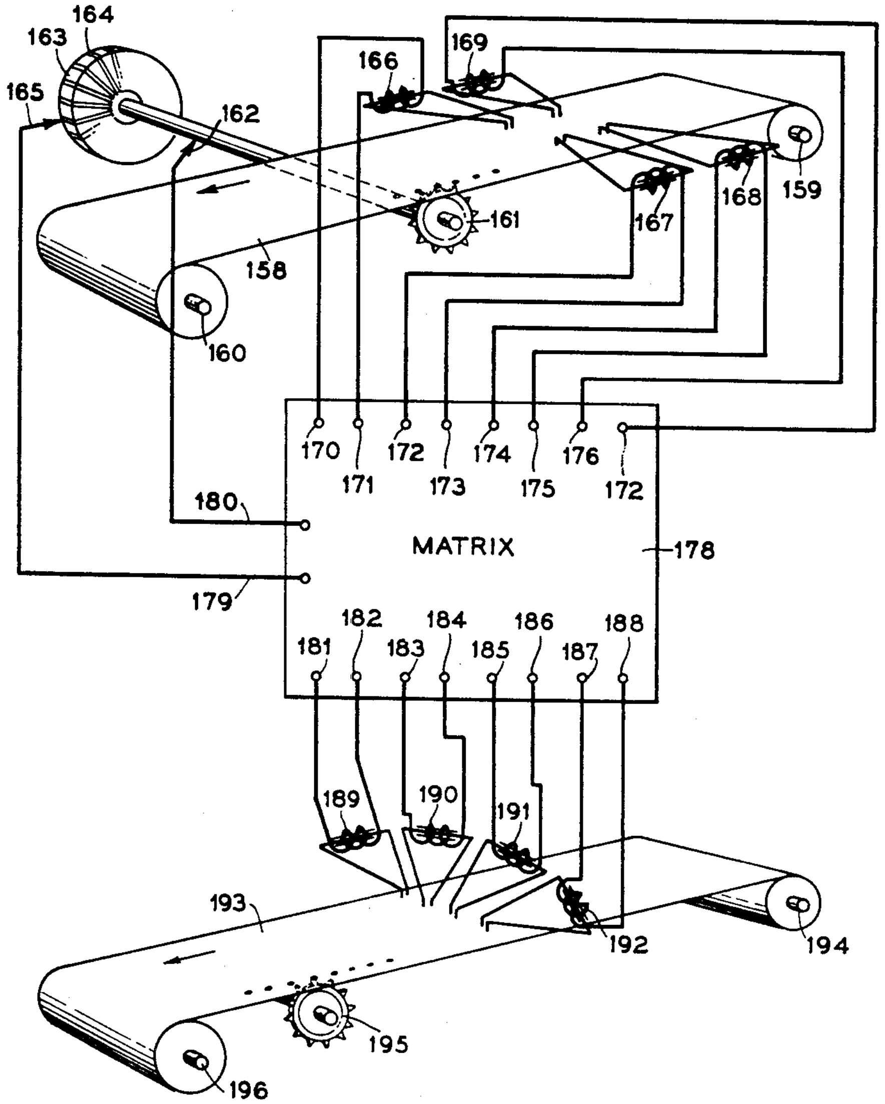
Fig. 5 shows another form of the invention in which magnetic recording is utilized.

Fig. 5 shows another form of the present invention in which information magnetically recorded according to one code or configuration is operated upon in a matrix and rerecorded according to a different code or configuration on a second magnetic tape. The matrix 178 represents a system for receiving pulses representing information according to the first code and for producing pulses for rerecording according to the second code such as the system made up of amplifiers, mixers and thyratrons in Fig. 1. The function of providing commutator pulses in Fig. 5 is performed by the commutator 163 having conducting segments 164 which close a circuit between contacts 162 and 165 in accordance with the rotation of the magnetic tape driving sprocket 161 to which the commutator is coupled.

Coded information is magnetically recorded upon magnetic tape 158 which passes from supply roll 159 to take-up roll 160. The tape is pulled past the pick-up area by means of sprocket 161, driven by any suitable well-known means such as an electric motor, not shown, so that a predetermined relationship exists between the motion of the tape and the rotation of commutator 163. Magnetic pick-ups 166, 167, 168 and 169 arranged in a predetermined configuration to conform to the configuration of the coded recordings on the tape, in the case illustrated, in the form of a square as shown by the locations of the projecting poles of the magnetic pick-ups. Pulses generated in the coils of these pick-ups by the recorded information are applied to the matrix 178 at input points 170, 171, 172, 173, 174, 175, 176 and 177 respectively. The matrix is keyed by the closing of the circuit over leads 179, 180 by commutator 163. The output pulses produced by the matrix, produced in same manner that relays are energized in Fig. 1, are supplied at output points 181, 182, 183, 184, 185, 186, 187 and 188 to which are connected magnetic recorders 189, 190, 191 and 192 respectively. The recorders are arranged in a predetermined configuration to produce the desired coded recordings, in the case illustrated in a straight line as shown by the terminations of the recorder poles. The rerecording is accomplished upon a second magnetic tape 193 passing from supply roll 194 to take-up roll 196. The spacial relationship between the recordings and predetermined points on the tape is maintained by driving the tape by means of sprocket 195 rotated by any suitable means, not shown.

While only two embodiments of the present invention have been shown and described many modifications and combinations will be apparent to those skilled in the art within the spirit and scope of the invention as set forth in the appended claims.

What is claimed is:

1. In a system for scanning punched cards, the combination of, a plurality of photo-electric cells for simultaneously scanning predetermined groups of holes in a punched card and providing output pulses in accordance with the occurrence of said holes, a photo-electric cell for scanning commutator holes in said cards to provide pulses in accordance with the occurrence of said commutator holes, a plurality of mixers, means for applying both of said pulses to said mixers for providing a third pulse upon the coincidence of said applied pulses, a plurality of thyratrons, a relay coupled to each of said thyratrons, a ring counter including a plurality of stages, means for coupling each stage of said ring with a predetermined group of thyratrons to prime said thyratrons in response to the "on" condition of a ring stage, means for applying pulses from said commutator scanning photo-electric cell to provide stage by stage "on" condition advance in said ring stages, and means for applying said third pulses to said thyratrons to fire the primed thyratrons and to pull up said relays in accordance with the firing of said thyratrons.

2. In a device of the class described, the combination of, means for generating electrical pulses in accordance with information recorded upon a medium according to one configuration, utilization means, and a matrix including gating means controlled by a plurality of ring stages for distributing said pulses in a predetermined pattern to said utilization means.

3. In a device of the class described, the combination of, a plurality of pick-up devices for generating electrical pulses in accordance with recorded information, a plurality of mixers for receiving said pulses, a plurality of ring stages for controlling said mixers, a commutator for stepping said ring stages, and utilization means for utilizing the controlled output of said mixers.

4. In a scanning system, the combination of, a plurality of photo-electric cells for coincidentally scanning predetermined groups of hole positions, means for gating said photo-electric cells at predetermined intervals to prevent ambiguous responses from said coincidental scanning, a plurality of relays to be operated in accordance with the findings of said coincidental scanning, thermionic means for energizing said relays, and ring stages coupled to said gating means for priming predetermined groups of said thermionic means to render them responsive to signals from said gated photo-electric cells.

5. In a scanning device, the combination of, groups of photo-electric cells for generating pulses in response to the presence of information in predetermined positions, commutator means for identifying the positioning of said photo-electric cells with said information positions, means for scanning said commutator means to generate commutator pulses, means for mixing the first said pulses and said commutator pulses to generate a third group of pulses upon coincidence of said first and said commutator pulses, and means responsive to said third group of pulses for closing electrical circuits in accordance with the presence of said information.

JOHN T. POTTER.

REFERENCES CITED

The following references are of record in the file of this patent:

UNITED STATES PATENTS

| Number | Name | Date |
|---|---|---|
| 2,240,800 | Rigert | May 6, 1941 |
| 2,266,779 | Loughridge | Dec. 23, 1941 |
| 2,277,579 | Burger | Mar. 24, 1942 |
| 2,411,065 | Green | Nov. 12, 1946 |
| 2,411,531 | Engelhardt | Nov. 19, 1946 |
| 2,417,427 | Massonneau | Mar. 18, 1947 |
| 2,479,518 | Scherbatskoy | Aug. 16, 1949 |